United States Patent
Toyofuku

(10) Patent No.: US 6,920,785 B2
(45) Date of Patent: Jul. 26, 2005

(54) TIRE PRESSURE SENSOR UNIT, TIRE PRESSURE MONITORING SYSTEM, AND METHOD OF REGISTERING IDENTIFICATION CODE OF TIRE PRESSURE SENSOR UNIT

(75) Inventor: Masanobu Toyofuku, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 69 days.

(21) Appl. No.: 10/477,738

(22) PCT Filed: May 1, 2002

(86) PCT No.: PCT/JP02/04363
§ 371 (c)(1),
(2), (4) Date: Nov. 14, 2003

(87) PCT Pub. No.: WO02/094588
PCT Pub. Date: Nov. 28, 2002

(65) Prior Publication Data
US 2004/0149025 A1 Aug. 5, 2004

(30) Foreign Application Priority Data
May 17, 2001 (JP) .............................. 2001-147734

(51) Int. Cl.⁷ .............................................. G01M 17/02
(52) U.S. Cl. ..................... 73/146; 73/146.5; 340/442; 340/447
(58) Field of Search ............................... 73/146–146.5; 340/442–447

(56) References Cited

U.S. PATENT DOCUMENTS

| | | | |
|---|---|---|---|
| 5,581,464 A | * | 12/1996 | Woll et al. .................. 701/35 |
| 5,612,671 A | | 3/1997 | Mendez et al. |
| 6,246,933 B1 | * | 6/2001 | Bague ........................ 701/35 |
| 6,400,261 B1 | * | 6/2002 | Starkey et al. ............. 340/442 |
| 6,486,773 B1 | * | 11/2002 | Bailie et al. ................ 340/445 |
| 6,505,507 B1 | * | 1/2003 | Imao et al. ................ 73/146.5 |
| 6,683,537 B2 | * | 1/2004 | Starkey et al. ......... 340/870.16 |

FOREIGN PATENT DOCUMENTS

| | | |
|---|---|---|
| EP | 769395 A1 | 4/1997 |
| JP | 9-210827 A | 8/1997 |
| JP | 10-19710 A | 1/1998 |
| JP | 11-211598 A | 8/1999 |
| JP | 2000-108620 A | 4/2000 |
| JP | 2000-142044 A | 5/2000 |

* cited by examiner

Primary Examiner—Max Noori
Assistant Examiner—Jermaine Jenkins
(74) Attorney, Agent, or Firm—Sughrue Mion, PLLC

(57) ABSTRACT

A sensor unit body 10 of a tire pressure sensor unit 1 is provided with external signal-importing terminals 22 for rewriting data of self-identification code stored in a ROM 21, so that a complex operation of associating the self-identification code of the sensor unit with its mounting position in the vehicle is eliminated by rewriting the self-identification code of the sensor unit 1 after the replacement to be identical to the self-identification code of the sensor unit 1 before the replacement, when a tire wheel is replaced due to a breakdown of the tire unit or a replacement between a summer tire and a winter tire.

6 Claims, 5 Drawing Sheets

TIRE PRESSURE SENSOR UNIT, TIRE PRESSURE MONITORING SYSTEM, AND METHOD OF REGISTERING IDENTIFICATION CODE OF TIRE PRESSURE SENSOR UNIT

TECHNICAL FIELD

The present invention relates to a tire pressure sensor unit for monitoring tire pressure of a vehicle and notifying a driver of a trouble (hereinafter referred to as the "sensor unit"), a tire pressure monitoring system using same, and a method of registering a self-identification code of the tire pressure sensor unit.

BACKGROUND

There has conventionally been known a tire pressure monitoring system having a tire pressure monitor provided on a vehicle body for notifying a driver of a trouble in tire pressure, and a sensor unit installed in a tire wheel of the vehicle for sensing pressure of a tire and transmitting information about the sensed tire pressure to the tire pressure monitor via radio waves.

There has also been proposed a system in which, in order to notify the driver of information about a mounting position in the vehicle of the sensor unit detecting a trouble of the tire, for example, the right front wheel of the vehicle as well as the tire pressure in case of detecting a trouble in tire pressure, a self-identification code specific for each sensor unit is stored in a fixing memory of the sensor unit at each mounting position and a corresponding relation between each sensor unit and mounting position in the vehicle is set and stored in the tire pressure monitor beforehand, so that, when the sensor unit detect a trouble, the sensor unit transmits the self-identification code as well as the information about tire pressure to the tire pressure monitor while the tire pressure monitor specify the corresponding mounting position in the vehicle based on the transmitted self-identification code to notify the driver of the position.

In this conventional system, the self-identification code of the sensor unit is usually configured to be written in its fixing memory during the manufacturing of the sensor unit and unable to be rewritten after shipment to prevent the data from rewriting by a malfunction or the like.

The above-mentioned operation of setting the corresponding relation between the self-identification code and the mounting position in the vehicle of the sensor unit is usually performed during the manufacturing stage of the vehicle prior to the shipment. The operation is performed by, for example, actually reducing each tire pressure to tentatively cause a trouble, subsequently recovering the tire pressure, associating the transmitted self-identification code with the position in the vehicle of the tire, storing the association in the tire pressure monitor, and repeating this sequence, which operation is extremely complex.

The conventional tire pressure sensor unit has the following problems. That is, when any one of sensor units in the respective mounting position in the vehicle is replaced with a new unit due to a breakdown or the like, the replacing sensor unit has a different self-identification code from that of the sensor unit having been installed before the replacement, so that an operation of setting a relation between the new self-identification code and a mounting position in the vehicle of the sensor unit has to be further performed, which is extremely complex and time consuming.

Moreover, when a replacement between summer tires and winter tires is conducted, the summer tires and the winter tires both of which are attached in a certain mounting position in the vehicle have respectively different self-identification code since these tires are stored and replaced in such a state that they are assembled in rims, so that an operation of associating the self-identification code with the mounting position in the vehicle of the tire pressure sensor unit is needed in every replacement between the summer tires and the winter tires. Due to the necessity of the time consuming operation, it is an actual condition that no tire pressure monitoring system notifying a mounting position in the vehicle of tire with which a trouble is detected has been made for practical use yet.

The present invention has been made in view of these problems, and its object is to provide a sensor unit capable of eliminating the operation of associating the self-identification number with the tire wheel to which the sensor unit is attached and facilitating a replacement operation of tire wheels when the tire wheel is replaced.

DISCLOSURE OF THE INVENTION

The present invention has been completed to achieve the above-mentioned object, and its gist, constitution and operation will be described below.

(1)

The sensor unit of the present invention is a sensor unit having a pressure sensor installed in a tire wheel of a vehicle to sense tire pressure of the tire wheel, a transmitter transmitting information at least about the tire pressure to a pressure monitor provided on the vehicle and a fixing memory for storing data including data of a self-identification code specific for the sensor unit, which comprises an interface for importing signals from external sources, wherein the fixing memory is so configured that the data can be rewritten by the external input imported via the interface.

According to this sensor unit, when the tire wheel is replaced, as the fixing memory is so configured that the data can be rewritten and the sensor unit has the interface for importing an external input signal which rewrites data in the fixing memory, a self-identification code identical to that of the sensor unit attached to the tire wheel before the replacement can be written in the sensor unit after the replacement via the interface. Consequently, when a trouble in tire pressure happens, the same self-identification code before the replacement can be used for the sensor unit after the replacement to specify a mounting position in the vehicle of the sensor unit where trouble is happening, so that the above-mentioned operation of newly associating the self-identification code of the sensor unit with its mounting position in the vehicle is not necessary.

Similarly, when winter tires are used instead of summer tires, a self-identification code of the sensor unit in a mounting position in the vehicle where the winter tire is to be mounted is registered with making it identical to the code of the sensor unit of the corresponding summer tire mounted in the respective mounting position in the vehicle, so that the self-identification code being identical to that at the time of using the summer tire can be used for the winter tire to be associate with the respective mounting position in the vehicle and the above-mentioned complex operation of associating the self-identification code with the mounting position in the vehicle is not necessary. In this way, once the self-identification code of the winter tire is registered, in a subsequent replacement between summer tires and winter tires, the complex operation of associating the self-identification code with the mounting position in the vehicle or the operation of re-registering the self-identification code are not necessary, so that the tire can be very easily replaced.

Since the sensor unit can rewrite or add data after the manufacturing of the sensor unit, data other than the self-identification code can be rewritten or added. As an example of such a use, when a lower set value of tire pressure written in the fixing memory of the sensor unit is intended to be used as a value for determining an occurrence of a trouble in the tire pressure monitoring system, the sensor unit provided for a replacement is desired to be adaptable for tires in broad sizes with different proper pressure, whereby the lower set value of tire pressure is written after a tire for a combination with the sensor unit is determined. As the sensor unit of the present invention can rewrite the data in the fixing memory, it can satisfy this needs and provide a new application of the sensor unit.

(2)

The tire pressure sensor unit of the present invention is according to the invention mentioned in (1), wherein the interface is consisted of external signal-importing terminals capable of being connected to external devices by means of wires.

The sensor unit can import an external signal via the external signal-importing terminals, so that, in addition to the above-mentioned action, it can write more reliable data than other methods using radio waved or magnetism do. Simultaneously, the data can be prevented from being unintendedly rewritten by a malfunction or a wrong operation.

Moreover, although a dedicated rewriting device is required as an external device used for rewriting the data, the writing operation takes place in connection with a rim assembly operation and thus, as far as tire stores, auto repair shops and the like own the dedicated rewriting devices and carry out rewriting operation, the operation can be carried out at a low cost and easily becomes into practical use.

(3)

The tire pressure sensor unit of the present invention is according to the invention mentioned in (1) or (2), wherein the information at least about the tire pressure is transmitted to a tire pressure monitor via radio waves.

In this tire pressure sensor unit, the information including information about tire pressure is transmitted to the tire pressure monitor via radio waves, so that, in addition to the above-mentioned action, the information from a plurality of sensor units located in mutually spaced position can be readily gathered at the tire pressure monitor.

In contrast, the method of transmitting signals by means of hard wires involves complex wiring, while the mounting position in the vehicle of the sensor unit can be easily specified since separate wires are used in the respective mounting positions in the vehicle of the sensor units. In comparison with this, it is difficult for the method of transmitting signal via radio waves to specify the mounting positions in the vehicle of the respective sensor units.

However, the sensor unit according to the present invention can register the self-identification code corresponding to the mounting position in the vehicle, so that the mounting position in the vehicle of the sensor unit can be specified to overcome the drawback of the method of transmitting signals via radio waves as well as to well utilize the convenience of transmission via radio waves.

(4)

The tire pressure sensor unit of the present invention is according to the invention mentioned in any one of (1) to (3), wherein a temperature sensor is provided.

According to this tire pressure sensor unit, information about tire temperature as well as the tire pressure can be transmitted to the tire pressure monitor, so that, in addition to the above-mentioned action, more detailed conditions of the tire pressure can be grasped to improve the reliability of the tire pressure monitoring system.

(5)

The tire pressure monitoring system of the present invention is characterized in that the tire pressure sensor units mentioned in any one of (1) to (4) is installed in a plurality of tire wheels of the vehicle, and that the tire pressure monitoring system comprises a tire pressure monitor receiving information from the sensor units and transmitting the information about the tire pressure to a driver.

In this tire pressure monitoring system, the data to be stored in the fixing memory can be rewritten after the manufacturing of the sensor unit constituting the system, so that, when the sensor unit breaks down or the replacement between a summer tire and a winter tire is conducted, the operation of associating the self-identification code with the mounting position in the vehicle can be omitted, as mentioned above.

(6)

The method of registering a self-identification code for a sensor unit of the present invention is characterized in that when a tire or a sensor unit is replaced and the tire is fitted onto a rim, a self-identification code is registered on a sensor unit mentioned in any one of (1) to (4), the self-identification code being identical to that of a sensor unit installed prior to the replacement on the mounting position of the vehicle where the former sensor unit is to be installed.

With the method of registering a self-identification code for a tire pressure sensor unit, when the sensor unit breaks down or the replacement between a summer tire and a winter tire is conducted, the operation of associating the self-identification code with the mounting position in the vehicle can be omitted, as mentioned above.

BEST MODE FOR CARRYING OUT THE INVENTION

Figure 1:
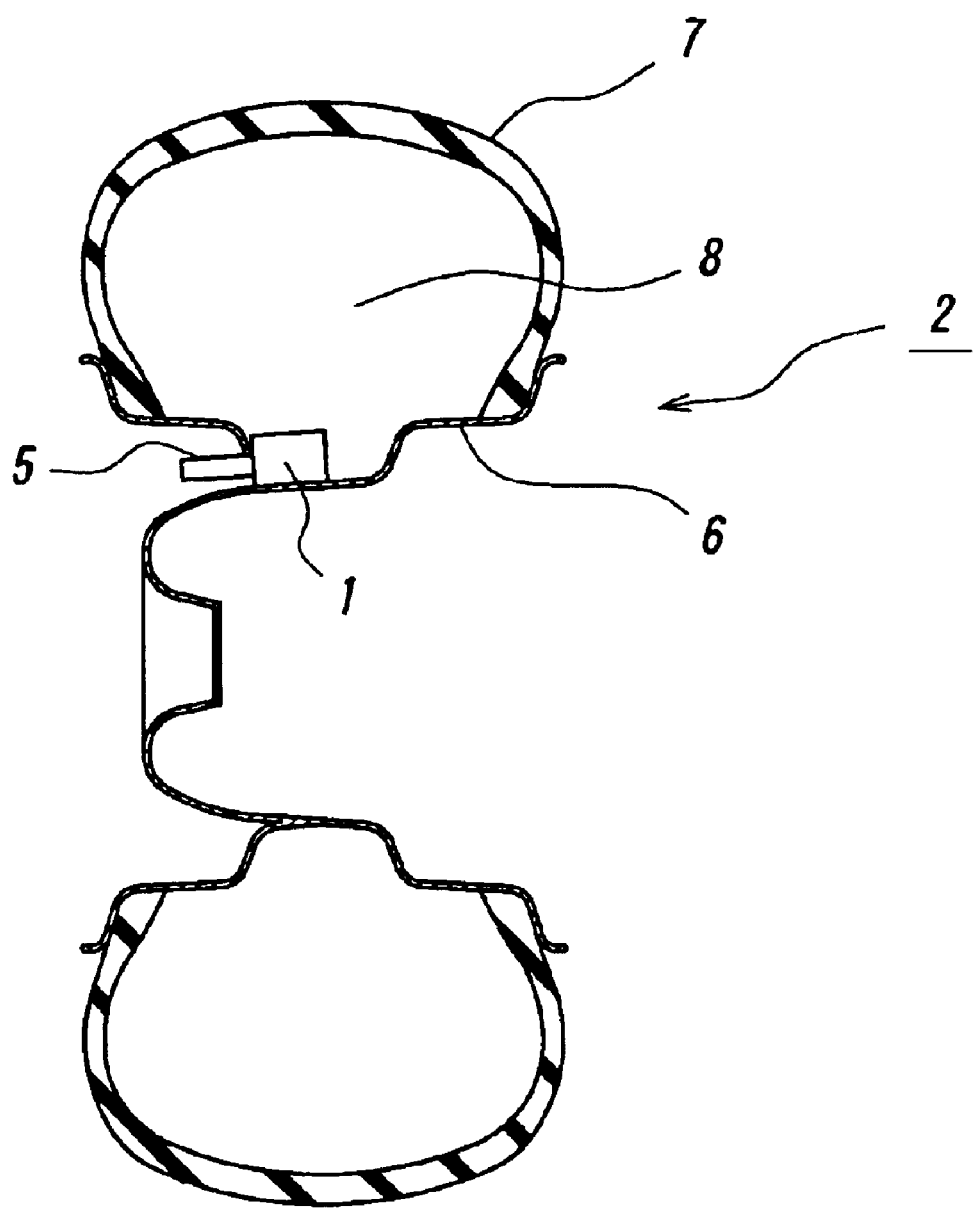
FIG. 1 is a schematic diagram of a sensor unit showing an installed state.

Hereinafter, inventive embodiments of the present invention will be described with reference to FIGS. 1 to 5. FIG. 1 is a schematic diagram showing in the state where a sensor unit 1 is installed in a tire wheel 2. The sensor unit 1 is coupled with a cylindrical valve device 5 for introducing air to be installed in a wheel rim 6. The wheel rim 6 and a tire 7 form a tire pressure part 8 and also constitute the tire wheel 2.

Figure 2:
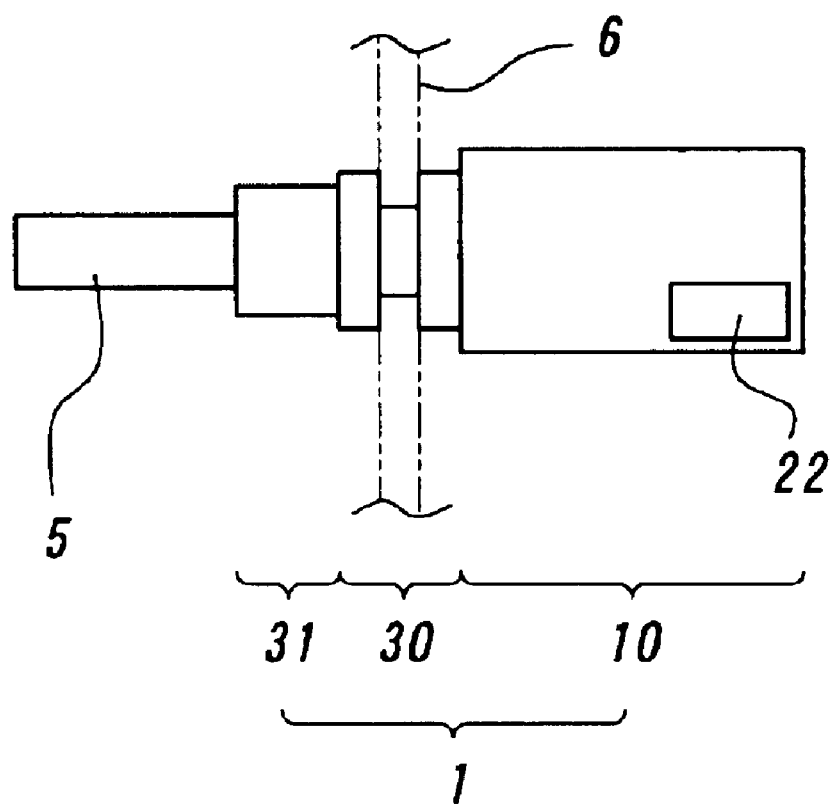
FIG. 2 is an outline diagram showing the sensor unit according to the present invention.

FIG. 2 is an outline diagram showing an outline of the sensor unit. The tire pressure sensor unit 1 is composed of a sensor unit body 10 having a external signal-importing terminal 22 for importing signals from external sources, a rim-attaching part 30 and an antenna part 31. The sensor unit 1 is also coupled with the valve device 5 to be installed in the wheel rim 6.

Figure 3:
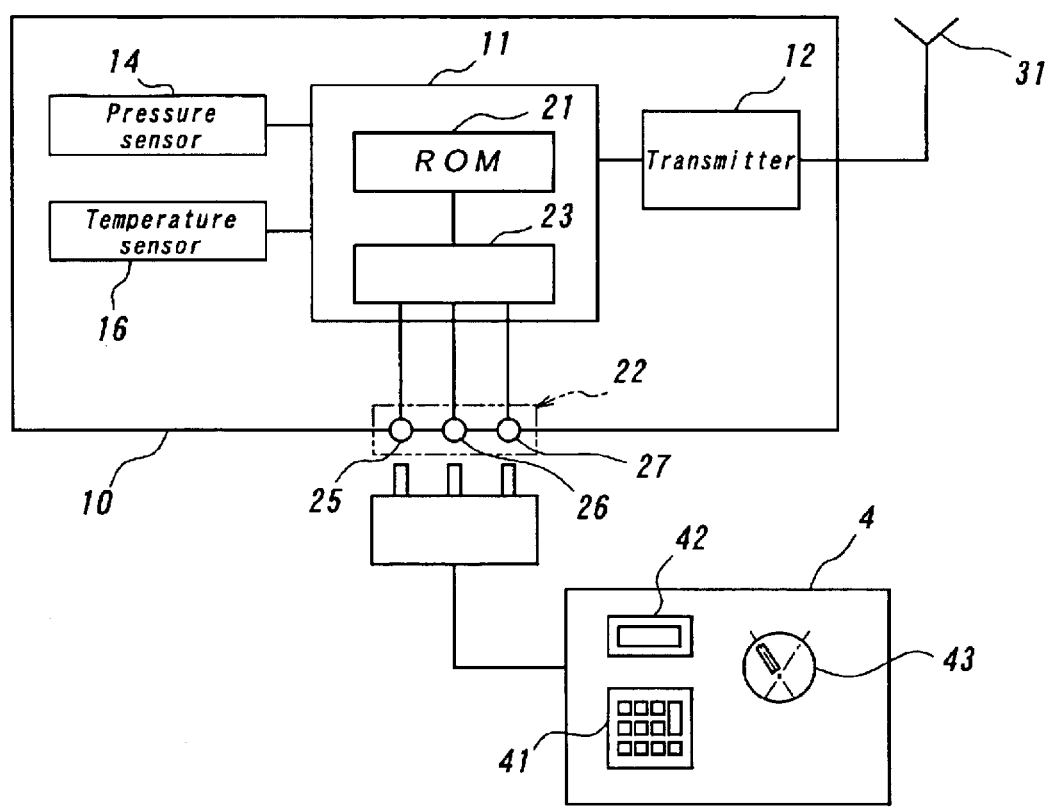
FIG. 3 is a schematic block diagram showing the electric circuit device of the sensor unit body.

The sensor unit body 10 incorporates an electric circuit device shown in FIG. 3 as a schematic block diagram. The electric circuit device is composed of a pressure sensor 14 for detecting tire pressure, a temperature sensor 16 for detecting the temperature of the tire pressure part 8, a controller 11, and a transmitter 12 for converting a signal from the controller into a transmitting signal from the antenna 31.

The controller 11 imports pressure data and temperature data detected by the pressure sensor 14 and the temperature sensor 16, respectively, and outputs the self-identification code and the lower set value of tire pressure stored in a ROM 21 as a fixing memory along with the pressure data and the temperature data at a given time. Note that the temperature sensor 16 is provided for alert a driver to a condition of the tire pressure part more specifically. It is preferable, but not always indispensable.

Moreover, the controller 11 is provided with the ROM 21 and an external input signal controller 23, so that the signal imported from the external signal-importing terminal 22 can be written in the ROM 21 via the external input signal controller 23. The external signal-importing terminal 22 has a ground terminal 25, a data signal terminal 26, and a data input/output control signal terminal 27.

A dedicated writing device 4 is connected to the external signal terminal 22 to write data from the dedicated writing device 4. The dedicated writing device 4 has a data input section 41, a data display 42, and a operation switching lever 43 for switching the operation between an "input mode" and a "rewriting mode", so that data can be written through these sections.

Figure 4:
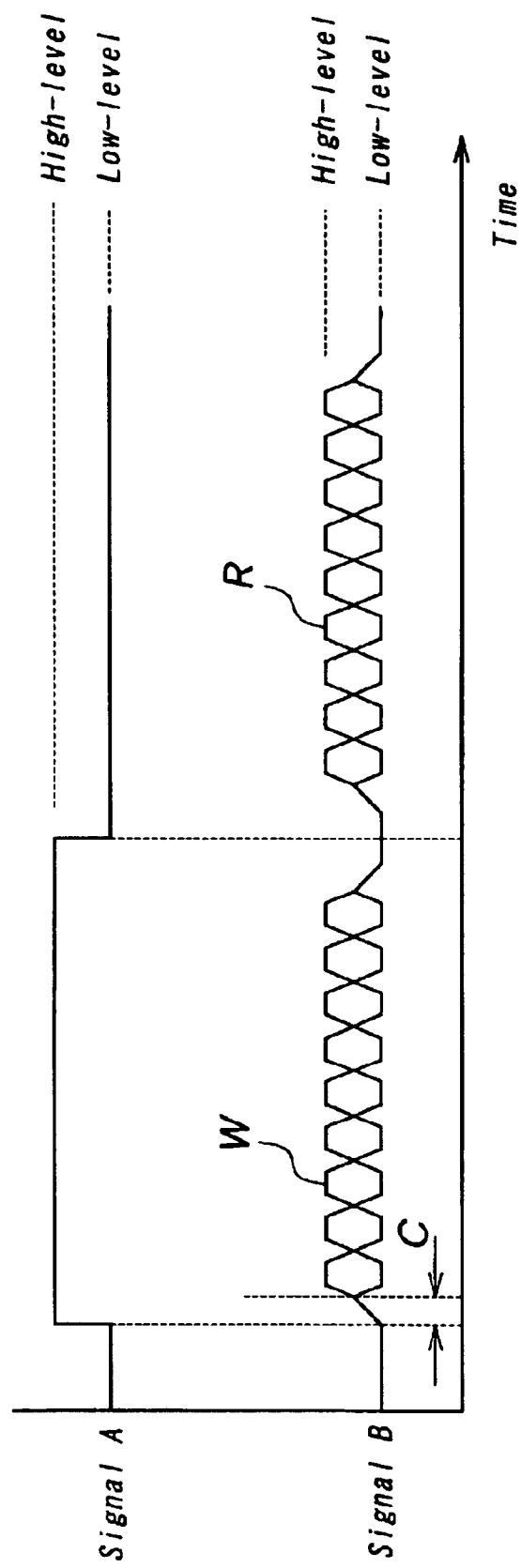
FIG. 4 is a wave form diagram showing a sequence of rewriting the self-identification code.

FIG. 4 shows a wave form chart during the writing of the self-identification code. A sequence of writing data is described with reference to this figure. In FIG. 4, the signal A designates a data input/output control signal input to the data input/output control signal terminal 27, and the signal B designates a data signal input to/output from the data signal terminal 26.

At the initial state, both of the signals A and B are at the low level. From this state, the dedicated writing device 4 is connected to the external signal-importing terminal 22 of the sensor unit body 10. The switching lever 43 of the dedicated writing device 4 is switched to the "input mode" side. A new self-identification code to be rewritten is input with the data input section 41 of the dedicated writing device 4. After that, the switching lever 43 is switched to the "rewriting mode" side, and then the signal A turns to the high level, so that, in response to the change of the signal A, the external input signal controller 23 performs a control for a preparation of importing the data signal. After a preparation time C has passed since the signal A turns to the high level, the dedicated writing device 4 outputs the self-identification code stored in the data input section 41 as the W part of the signal B to the external input signal controller 23, and, as the external input signal controller 23 is ready for importing the data, the data can be written in the ROM 21.

When the outputting the data to the external input signal controller 23 is finished, the dedicated writing device 4 outputs a signal for turning the signal A to the low level, whereby the external input signal controller 23 confirms a completion of the input, and outputs the imported self-identification code as the R part of the signal B to the dedicated writing device 4 for a verification. The dedicated writing device 4 automatically verity the signal, and if the verification is O.K., a sign of the completion of writing is displayed on the data display 42.

As the writing operation takes place in connection with a rim assembly operation, it is preferred that tire stores, auto repair shops and the like own the dedicated writing device 4 to perform the rewriting at these stores according to the above-mentioned sequence.

Figure 5:
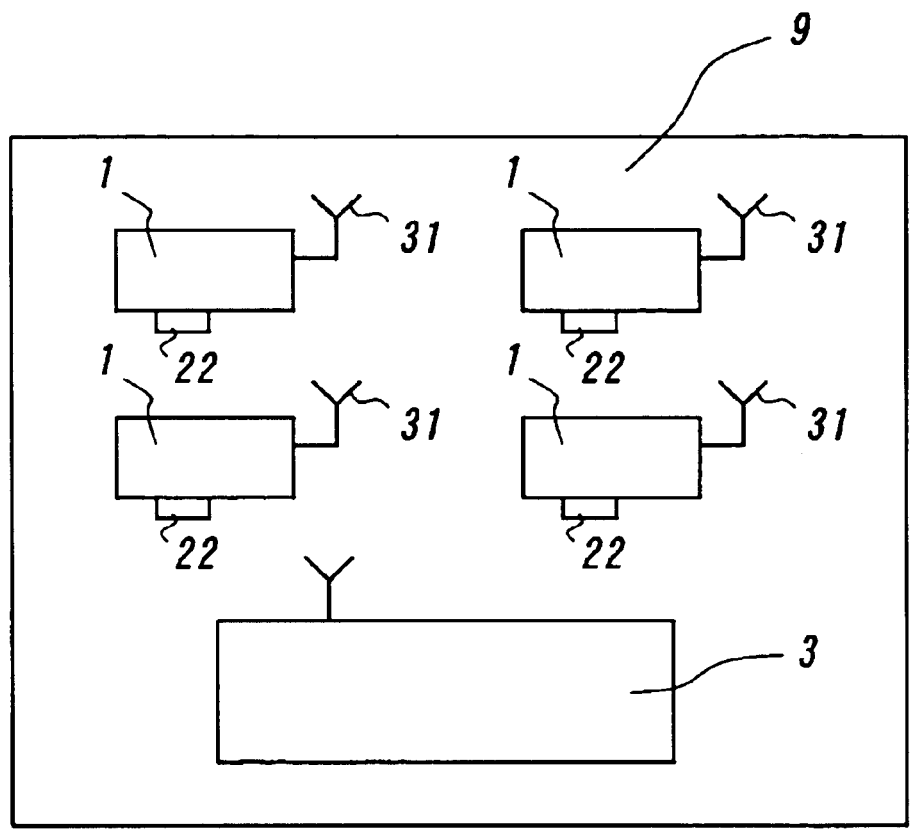
FIG. 5 is a schematic block diagram showing the tire pressure monitoring system using the sensor unit.

An example of a tire pressure monitoring system 9 using the sensor unit 1 is shown in FIG. 5 as a schematic block diagram. The tire pressure monitoring system 9 is composed of each sensor unit 1 attached to the respective tire wheel 6, and a tire pressure monitor 3 which receives data transmitted from the antenna 31 of the tire pressure sensor unit 1 and alert the driver to a condition of the tires. In this system, the sensor unit 1 is provided with the external signal importing terminal 22, so that stored data in the ROM 21 of the sensor unit 1 can be rewritten by the dedicated writing device 4.

In the next, a method of registering a self-identification code of a tire pressure sensor unit according to the present invention is exemplified. In a case where a sensor unit, for example, in the right front mounting position in the vehicle breaks down and is to be replaced, if an unique self-identification code registered before shipment is used as it is, a complex associating operation is necessary, as mentioned above. Since the self-identification code of the broken sensor unit has already been known, a corresponding relation between the self-identification code and the mounting position in the vehicle identical to that before the replacement can be maintained even after the replacement by registering an identification code identical to that of the broken sensor unit to a new sensor unit after the replacement. Thus, a complex operation of newly associating is eliminated, so that the productivity of the operation of replacing the sensor unit can be improved.

INDUSTRIAL APPLICABILITY

As having been clearly shown in the above description, according to the present invention, the tire pressure sensor unit is provided with an interface which allow the data in the fixing memory to be externally rewritten, so that, when a sensor unit breaks down and is to be replaced, or when a replacement between summer tires and winter tires is conducted, the operation of associating the self-identification code of the sensor unit with the mounting position in the vehicle with respect to the replacement can be saved by registering an identification code identical to that of the sensor unit before the replacement as the identification code of the sensor unit after the replacement.

In addition, according to the mounting situation of the sensor unit after the manufacturing, information other than the self-identification code such as a lower limit set value of tire pressure can be newly adding to the fixing memory, and it can be rewritten, which enlarges a versatility and applicability of the sensor unit.

What is claimed is:

1. A tire pressure sensor unit having a pressure sensor installed in a tire wheel of a vehicle to sense tire pressure of the tire wheel, a transmitter transmitting information at least about the tire pressure to a pressure monitor provided on the vehicle, and a fixing memory for storing data including data of self-identification code specific for the sensor unit, characterized in that said tire pressure sensor unit comprises an interface for importing signals input from external sources, and is so configured that the data stored in the fixing memory can be rewritten by the external signal imported from the interface.

2. The tire pressure sensor unit according to claim 1, wherein the interface is consisted of external signal-importing terminals capable of being connected to external input devices by wires.

3. The tire pressure sensor unit according to claim 1, wherein the information at least about the tire pressure is transmitted to a tire pressure monitor via radio waves.

4. The tire pressure sensor unit according to claim 1, wherein a temperature sensor is provided.

5. A tire pressure monitoring system, characterized in that the tire pressure sensor units according to claim 1 is provided in a plurality of tire wheels of the vehicle, and that said tire pressure monitoring system comprises a tire pressure monitor receiving information from the tire pressure sensor units and transmitting the information about the tire pressure to a driver.

6. A method of registering a self-identification code for a tire pressure sensor unit, characterized in that when a tire or a tire pressure sensor unit is replaced and the tire is fitted onto a rim, a self-identification code is registered on the tire pressure sensor unit claim 1, the self-identification code being identical to that of a sensor unit mounted prior to the replacement on the mounting position in the vehicle where the former sensor unit is to be installed.

* * * * *